Figure 1:
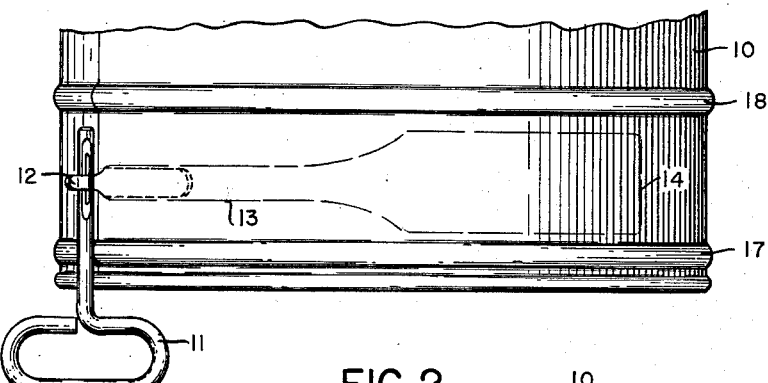

Feb. 12, 1963   C. E. GERMANO   3,077,213
SELF-CONTAINED MEASURING AND DISPENSING SPOUT
Filed Oct. 27, 1959                                    2 Sheets-Sheet 1

INVENTOR
C. E. GERMANO
BY
A. Yates Dowell
ATTORNEY

Feb. 12, 1963   C. E. GERMANO   3,077,213
SELF-CONTAINED MEASURING AND DISPENSING SPOUT
Filed Oct. 27, 1959   2 Sheets-Sheet 2
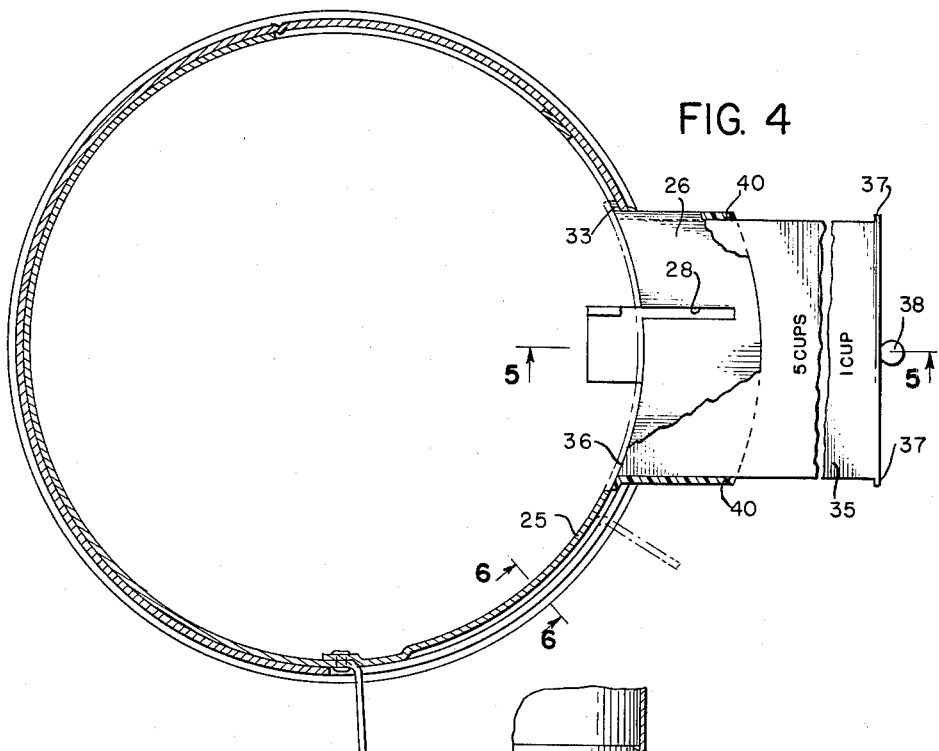
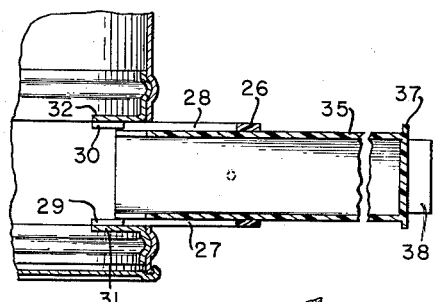
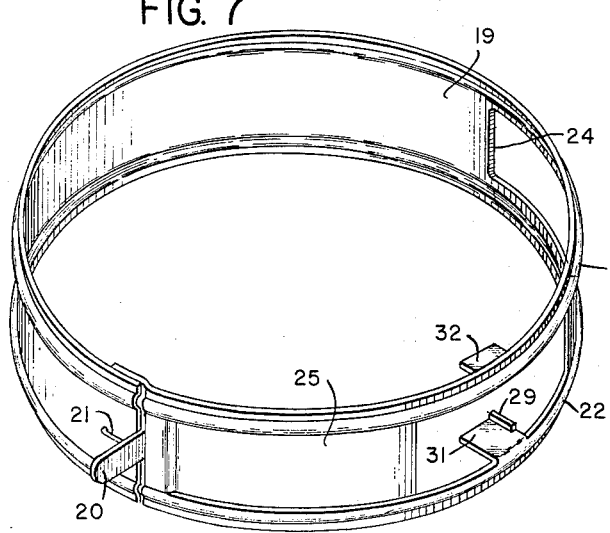
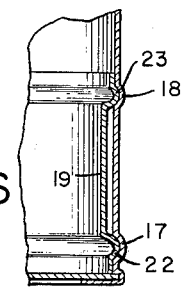
INVENTOR
C. E. GERMANO
BY *A. Yates Dowell,*
ATTORNEY

United States Patent Office 3,077,213
Patented Feb. 12, 1963

3,077,213
SELF-CONTAINED MEASURING AND
DISPENSING SPOUT
Charles E. Germano, Poughkeepsie, N.Y. (38th Materiel Squadron, APO 130, New York, N.Y.)
Filed Oct. 27, 1959, Ser. No. 849,047
4 Claims. (Cl. 141—358)

This invention relates to containers for coffee or other substance from which small quantities are dispensed for making a coffee beverage or the like from time to time and such coffee or other substances usually are purchased in hermetically sealed or tight containers and in which a key or the like is employed for breaking the vacuum and for opening the same.

This invention relates specifically to a container for coffee, tea or other substance having means by which a measured amount of such substance for example enough to make a desired number of cups of coffee can be readily dispensed by mechanism forming part of the container.

Heretofore, commodities such as coffee, tea and the like have been distributed in cans or containers and have had means by which the can or container could be opened to allow a portion of the contents to be removed and used and the cover replaced to keep the unused contents sealed from the atmosphere. Independent measuring spoons or other devices have been employed for removing the contents of these containers but these not always have been convenient or readily accessible and care and skill have been necessary in handling the several parts simultaneously.

It is an object of the invention to provide a simple and inexpensive dispensing device forming a part of a container and readily accessible for the quick dispensing of a portion of the contents of the container while maintaining the remaining contents sealed from the atmosphere pending further use thereof.

Another object of the invention is to provide dispensing mechanism for hermetically sealed cans or containers and which dispensing mechanism is of few and inexpensive parts, can be readily acquired and used to dispense a predetermined amount of the contents of a container in a minimum of time and effort.

A further object of the invention is to provide a dispensing structure applicable to a hermetically sealed container and capable of being used after the seal is broken to dispense a selected predetermined amount of the contents of the container and then the dispensing mechanism closed and the container locked in such closed condition.

Figure 2:
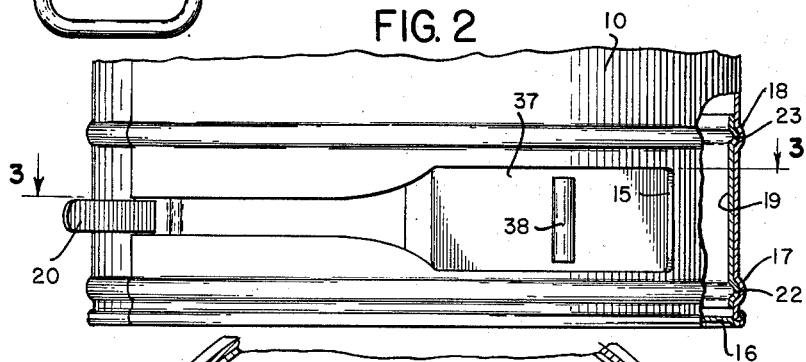
Figure 3:
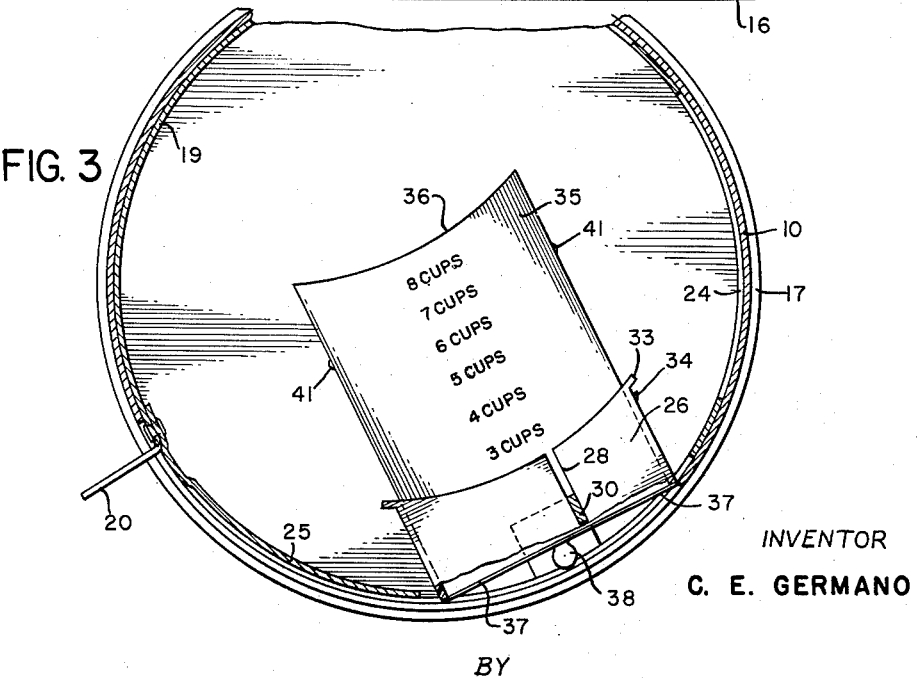

Other objects and advantages of the invention will be apparent from the following description taken in conjunction with the accompanying drawings wherein:

FIG. 1 is a side elevation illustrating one application of the invention;

FIG. 2, a similar view after the seal has been broken and the can or container opened;

FIG. 3, a section on the line 3—3 of FIG. 2;

FIG. 4, a view similar to that of FIG. 3 in which the dispensing mechanism is extended;

FIG. 5, a section on the line 5—5 of FIG. 4;

FIG. 6, an enlarged fragmentary detail section on the line 6—6 of FIG. 4; and

FIG. 7, a perspective of the dispensing ring by which the dispensing mechanism is manipulated.

Briefly stated, the present invention comprises a measuring and dispensing device for application to a can or container for coffee or other bulk material, the dispenser having a sleeve with a removable transparent cup within the container and the latter provided with a removable section or tear strip adapted to be removed by a key or other suitable means and in which after the strip has been removed, the sleeve and the cup may be extended beyond the confines of the container and a sliding valve or gate within the container moved by an operating tab extending through the tear strip moved to receive a predetermined amount of the material from the container, the discharge opening closed and the cup removed to discharge the contents.

With continued reference to the drawings, a conventional container 10 of cylindrical configuration and of metal or other material is provided for containing coffee or other bulk substance and such container is modified to produce the present structure. Such modification includes the provision of a key 11 by which a tongue or tip 12 and a tear strip 13 having an enlarged portion 14 can be removed to expose an opening 15 in the cylindrical wall of the container 10 through which the contents of the container can be dispensed.

In order to control the dispensing of bulk material such as coffee or the like, the container 10 is provided with a cover 16 and a pair of spaced grooves 17 and 18 within the end wall of the can in which is received a ring 19 connected together by a staple 21 and having an operating tab 20 flat against the ring until the tear strip 13 is removed at which time the tab is bent outwardly to a position substantially at right angles to the container. The ring is rotatable within the upper part of the can and is retained in such position by a pair of ribs 22 and 23 in cooperative engagement with the grooves or slideways 17 and 18 and slideable therein. Such ring 19 also is provided with an opening 24 and an offset portion 25 the operation of which will be later described.

The ring 19 is adapted to telescopically support a transparent sleeve 26 which is retained within the container by a pair of slots 27 and 28 on opposite sides of such sleeve and such slots engage opposed projections 29 and 30 attached to a pair of inwardly projecting flanges 31 and 32 within the opening 24 of the ring. The sleeve 26 is disposed within the container and the projections 29 and 30 prevent the sleeve from becoming disengaged. The sleeve is provided along its inner edge with a flange 33 of a configuration generally conforming to the interior configuration of the container so that when the tear strip is removed, the sleeve 26 may be moved outwardly through the opening 15 and the flange 33 will engage the interior of the container. The sleeve 26 is provided with a projection 34 which engages the container 10 to maintain the sleeve in extended position.

A hollow transparent measuring cup 35 of yieldable material having indicia inscribed thereon and open at one end is telescopically retained within the sleeve 26 and such cup has an arcuate inner portion 36 of substantially the same configuration as the interior of the container. The opposite end of the cup is provided with a flange 37 which prevents the cup from being inserted too far and a projection or finger grip 38 which may be grasped after the tear strip is removed to pull the cup 35 and the sleeve 26 out of the can to a position whereby the flange 33 snugly engages the interior of the container.

In order to maintain the cup 35 in extended position within the sleeve 26, the sleeve is provided with a pair of recesses 40 which engage a pair of cooperative projections 41 carried by the yieldable cup 35. When the cup is moved outwardly its sides will flex to permit the projections 41 to pass through the sleeve 26 until the projections are in cooperative engagement with the recesses 40 at which time the inner edge 36 of the cup 35 will be substantially flush with the flange 33.

When the sleeve 26 is extracted from the container, the flange 33 passes in close proximity to the offset portion 25 of the ring 19 when such ring is in fully open position so that material within the container cannot escape through the opening between the offset portion 25 and the flange 33. The portion 25 is offset the thickness of the flange 33 so that when the ring is rotated the offset portion 25 provides a sliding gate to control the flow of material into the cup 35.

In the operation of the device the tear strip 14 is first removed and the finger grip 38 grasped to extract the sleeve 26 and the cup 35 from within the container. The sleeve 26 slides outwardly until the flange 33 engages the interior periphery of the container and the cup 35 slides outwardly through the sleeve 26 until the projections 41 of the cup engage the recesses 40 in the sleeve. The container is then tilted so that the material will flow into the cup until the desired level is reached, at which time the ring 19 is rotated by the operating tab 20 so that the offset portion 25 closes off the open end 36 of the cup. Force is then applied to the cup to move it outwardly of the container with projections 41 thereon out of engagement with the recesses 40 whereupon the cup 35 may be withdrawn from the sleeve and the contents therein are emptied and the cup is then returned to its position within the sleeve and the ring is moved back to its original position.

It will be obvious to those skilled in the art that various changes may be made in the invention without departing from the spirit and scope thereof and therefore the invention is not limited by that which is illustrated in the drawings and described in the specification, but only as indicated in the accompanying claims.

What is claimed is:

1. The combination of a container for loose material and self-contained measuring and dispensing means, said container having spaced annular channels in its side adjacent one end, a ring having spaced ribs received in cooperative engagement with said channels, said container having a discharge opening and said ring having a portion for closing said discharge opening and an operating tab normally disposed flat against the exterior of said ring, said container having a strip capable of being removed by a key to expose said operating tab and said opening, an extensible sleeve adjustably carried by said ring within said container and movable outwardly to form a dispensing means, locking means on said sleeve for retaining said container and sleeve in adjusted relation, and a transparent cup having indicia for determining the amount of material therein removably retained by said sleeve.

2. The combination of a container for loose material and measuring and dispensing means within said container comprising a container having spaced annular channels in its side adjacent one end and a weakened portion capable of being removed by a key between said channels, a ring mounted within said container and having spaced ribs in cooperative engagement with said channels, means carried by said ring for causing movement thereof when said weakened portion has been removed, said ring having an opening and a pair of inturned flanges therein, a sleeve telescopically carried by said flanges within said opening and disposed within the container when the container is sealed but capable of being withdrawn from the ring when the weakened portion is removed, a yieldable cup having an inner edge of substantially the same configuration as the container and telescopically carried by said sleeve, means on said cup for cooperative engagement with said sleeve to maintain said cup in extended position but permitting separation when desired, and an offset portion on said ring adapted to conform closely to the inner edge of said cup whereby when the container is tilted material therein will flow into the cup and movement of the ring will cause said offset portion to extend across the inner edge of said cup to cut off the supply of material whereupon the cup is removed and the contents therein discharged.

3. The structure of claim 2 having means to limit the inward movement of said sleeve.

4. The structure of claim 3 having means to limit the inward movement of said cup.

References Cited in the file of this patent
UNITED STATES PATENTS

| | | |
|---|---|---|
| 1,606,194 | Strafford | Nov. 9, 1926 |
| 2,810,497 | Williams | Oct. 22, 1957 |